Sept. 23, 1941.     D. A. APOSTOLOU     2,256,857
DEVICE FOR NEUTRALIZING THE INERTIA OF VEHICLE BODIES
Filed Aug. 3, 1939     10 Sheets-Sheet 1
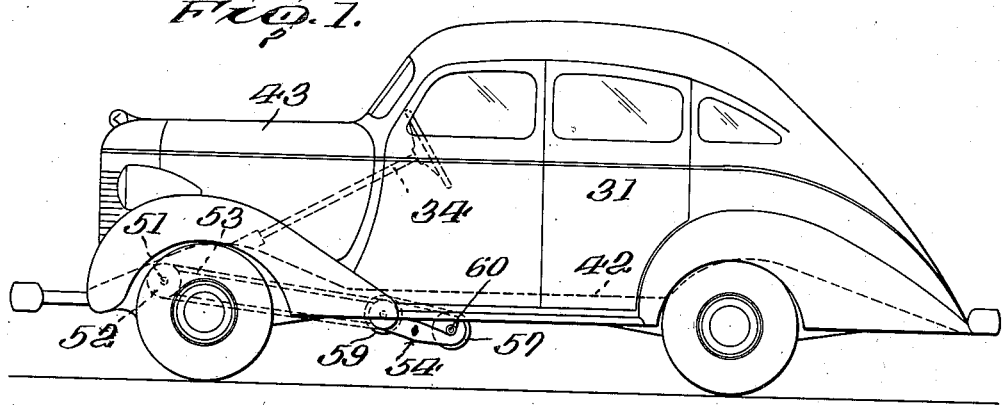
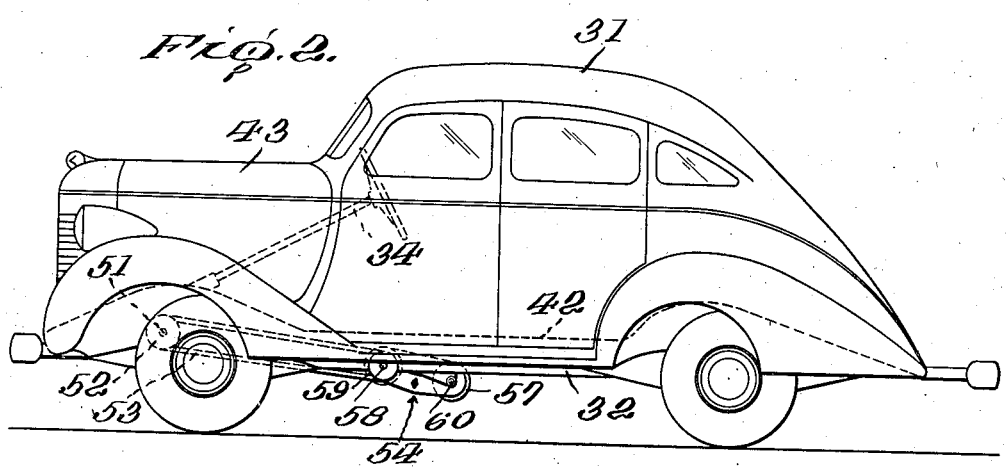
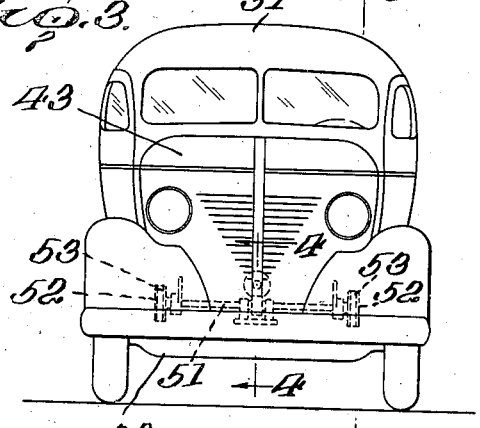
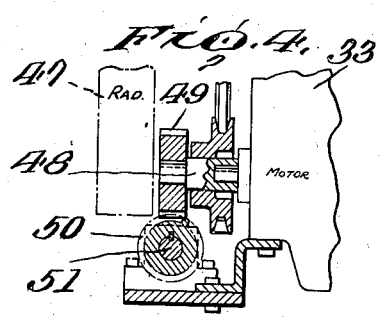
INVENTOR.
D. A. Apostolou
BY C. F. Wenderoth
ATTORNEY.

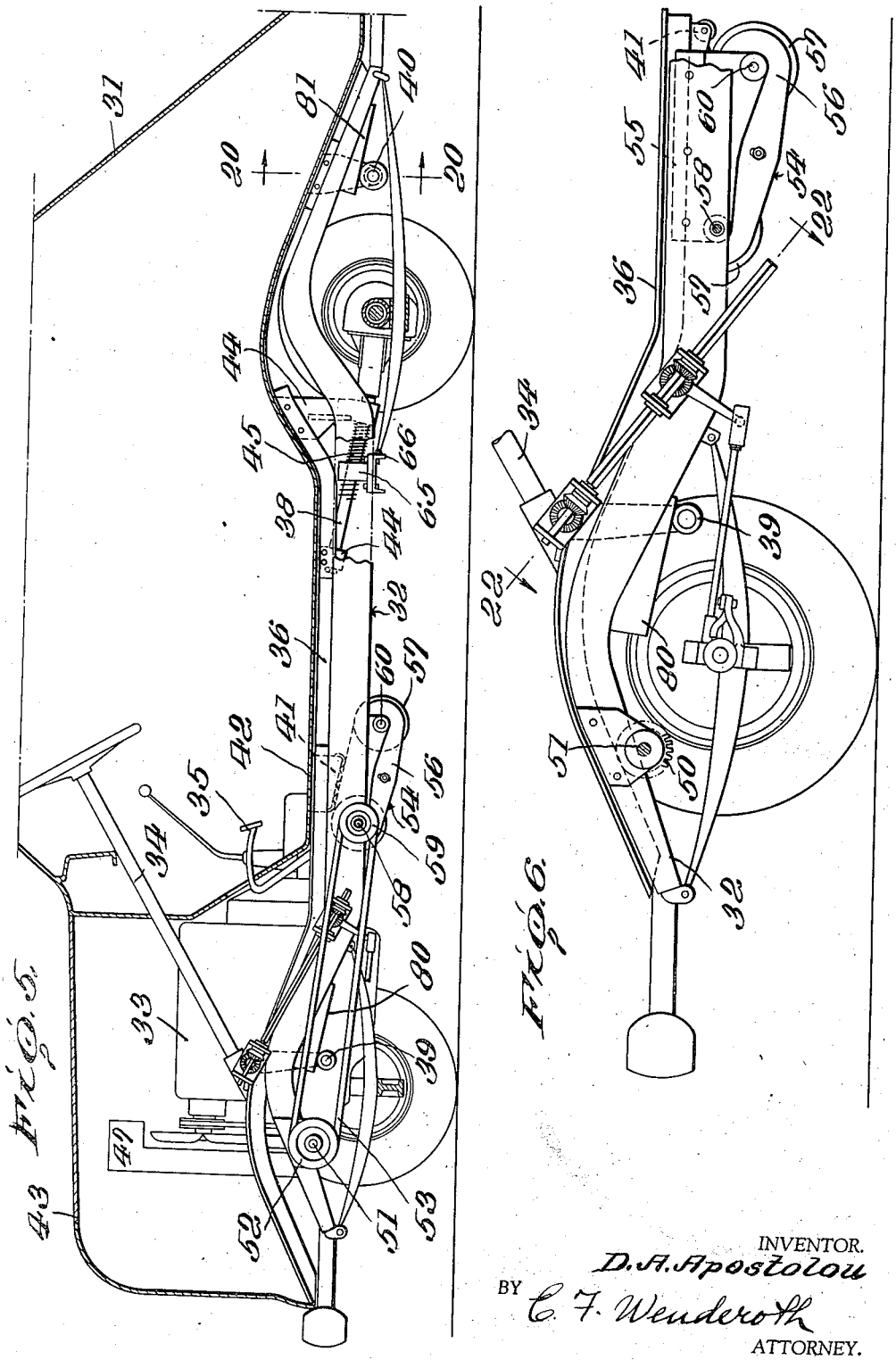

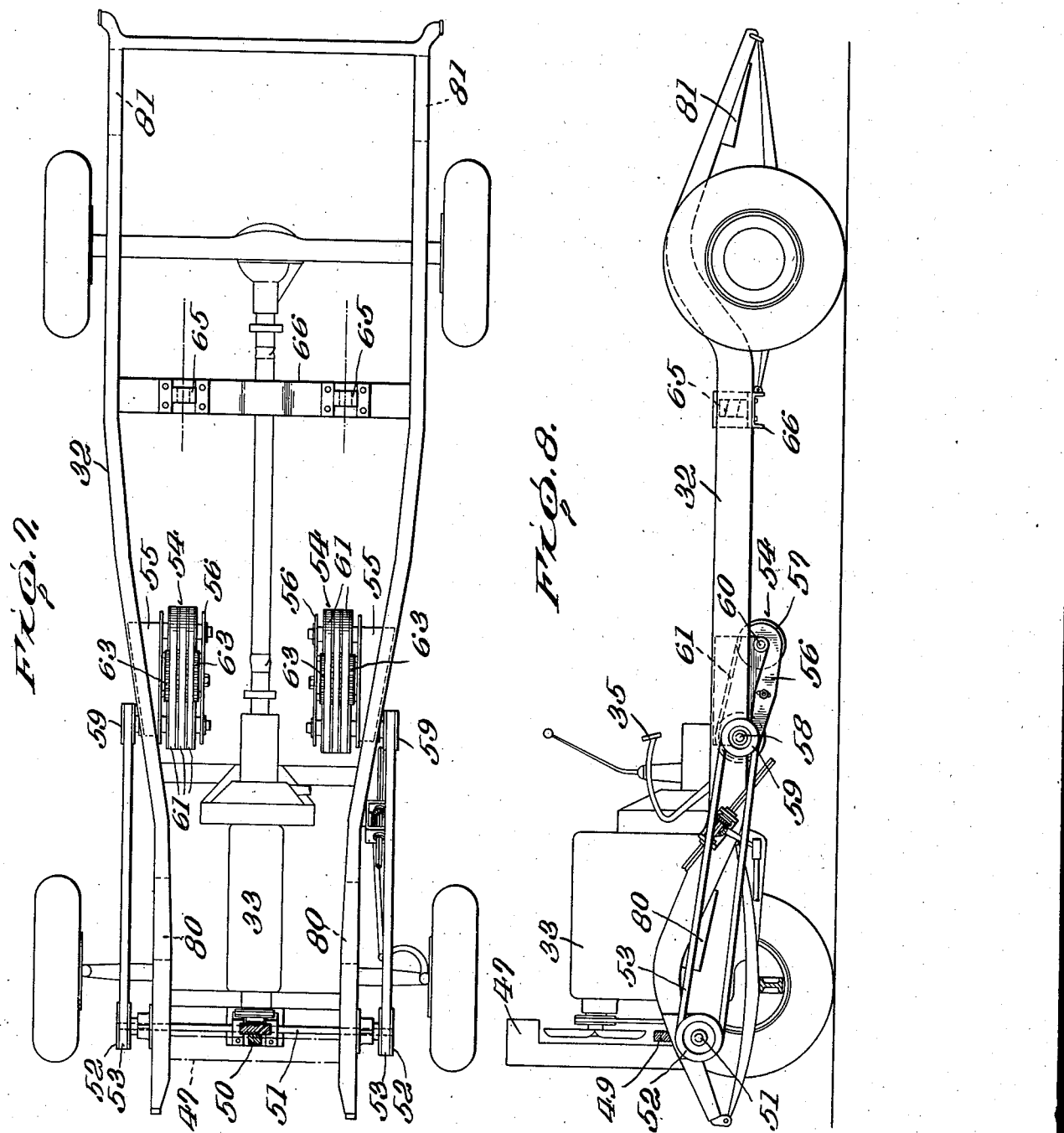

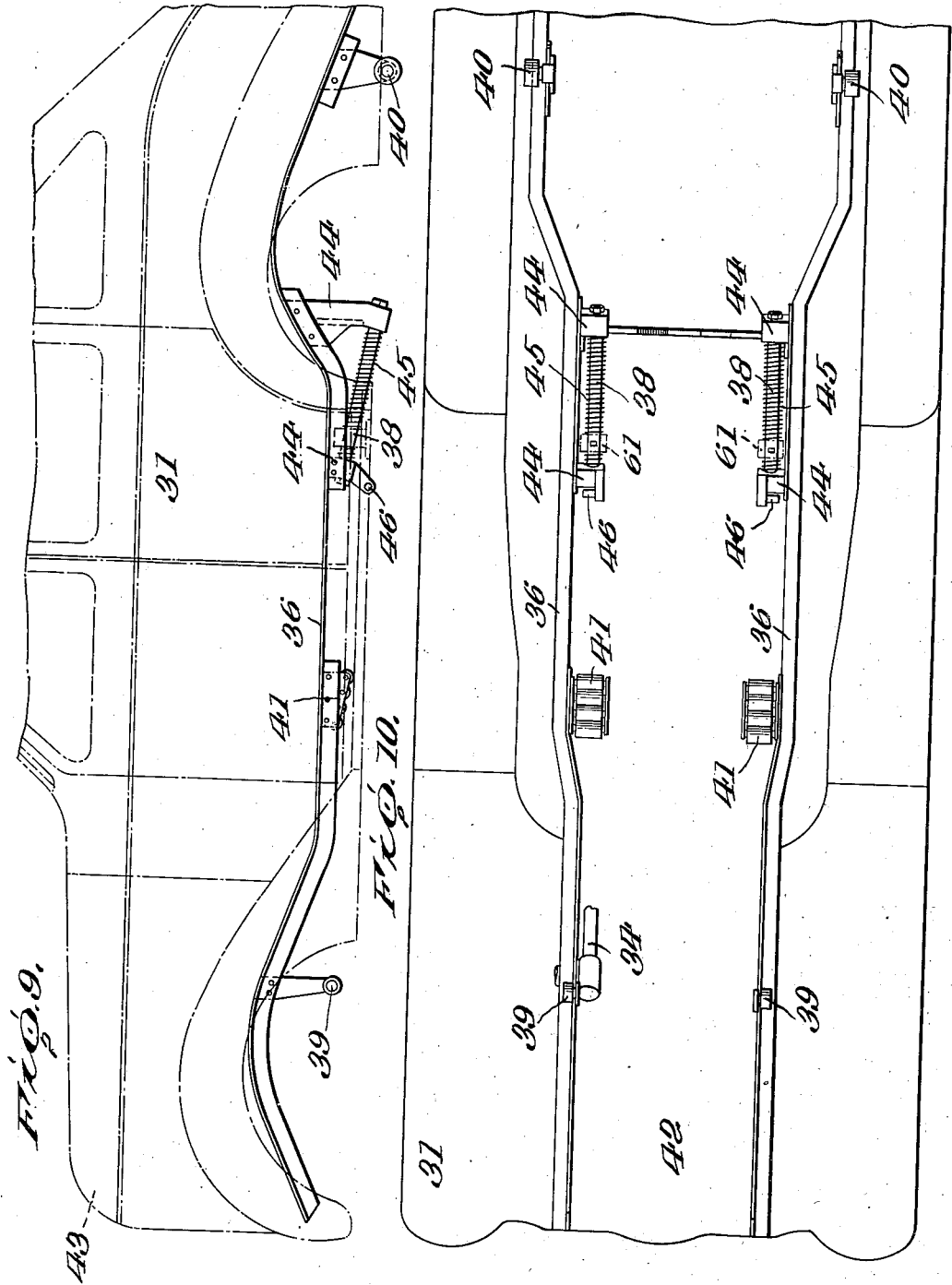
Sept. 23, 1941.  D. A. APOSTOLOU  2,256,857
DEVICE FOR NEUTRALIZING THE INERTIA OF VEHICLE BODIES
Filed Aug. 3, 1939  10 Sheets-Sheet 4
INVENTOR.
D. A. Apostolou
BY C. F. Wenderoth
ATTORNEY.

Sept. 23, 1941. D. A. APOSTOLOU 2,256,857
DEVICE FOR NEUTRALIZING THE INERTIA OF VEHICLE BODIES
Filed Aug. 3, 1939 10 Sheets-Sheet 5

INVENTOR.
D. A. Apostolou
BY C. F. Wenderoth
ATTORNEY.

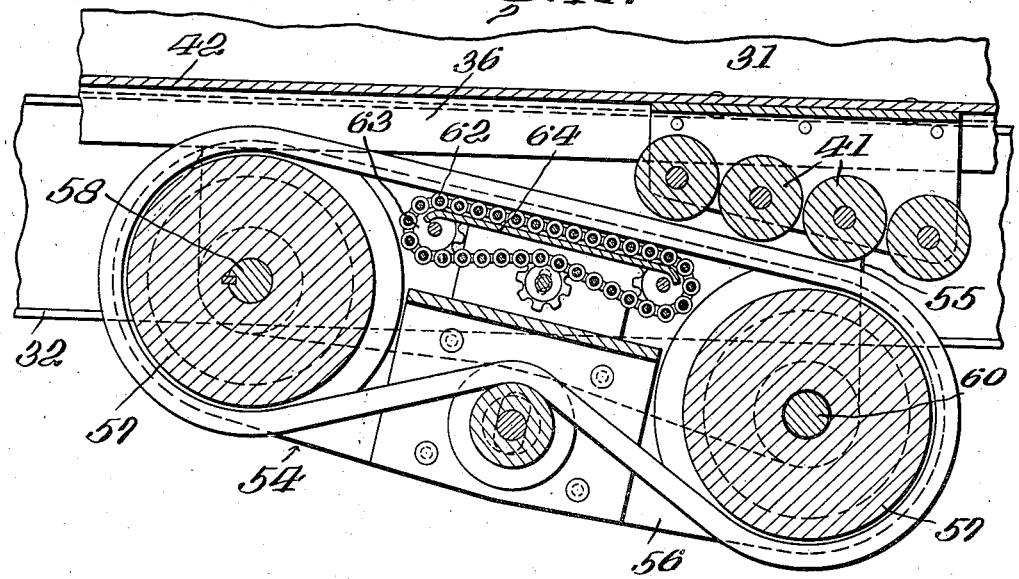
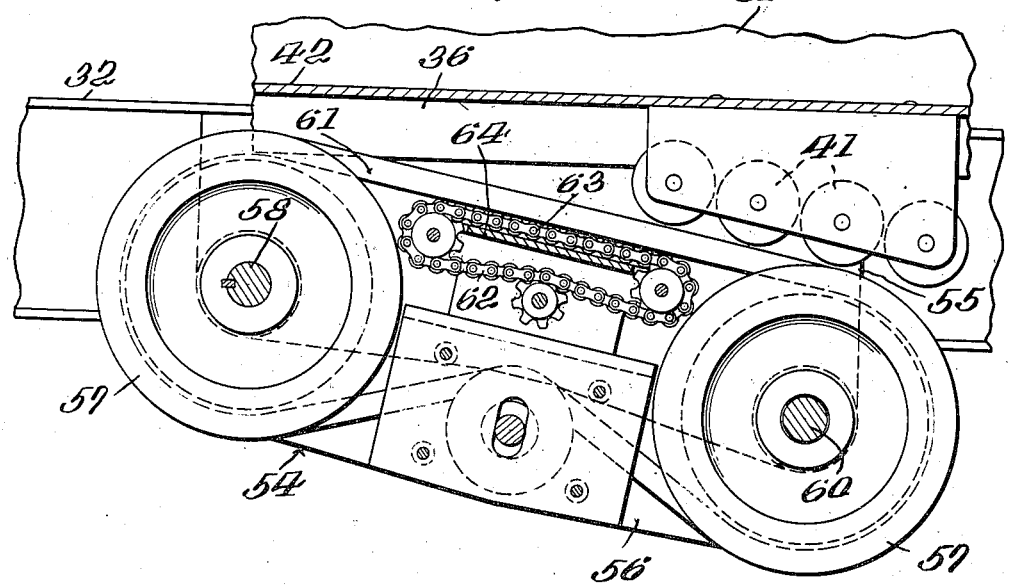

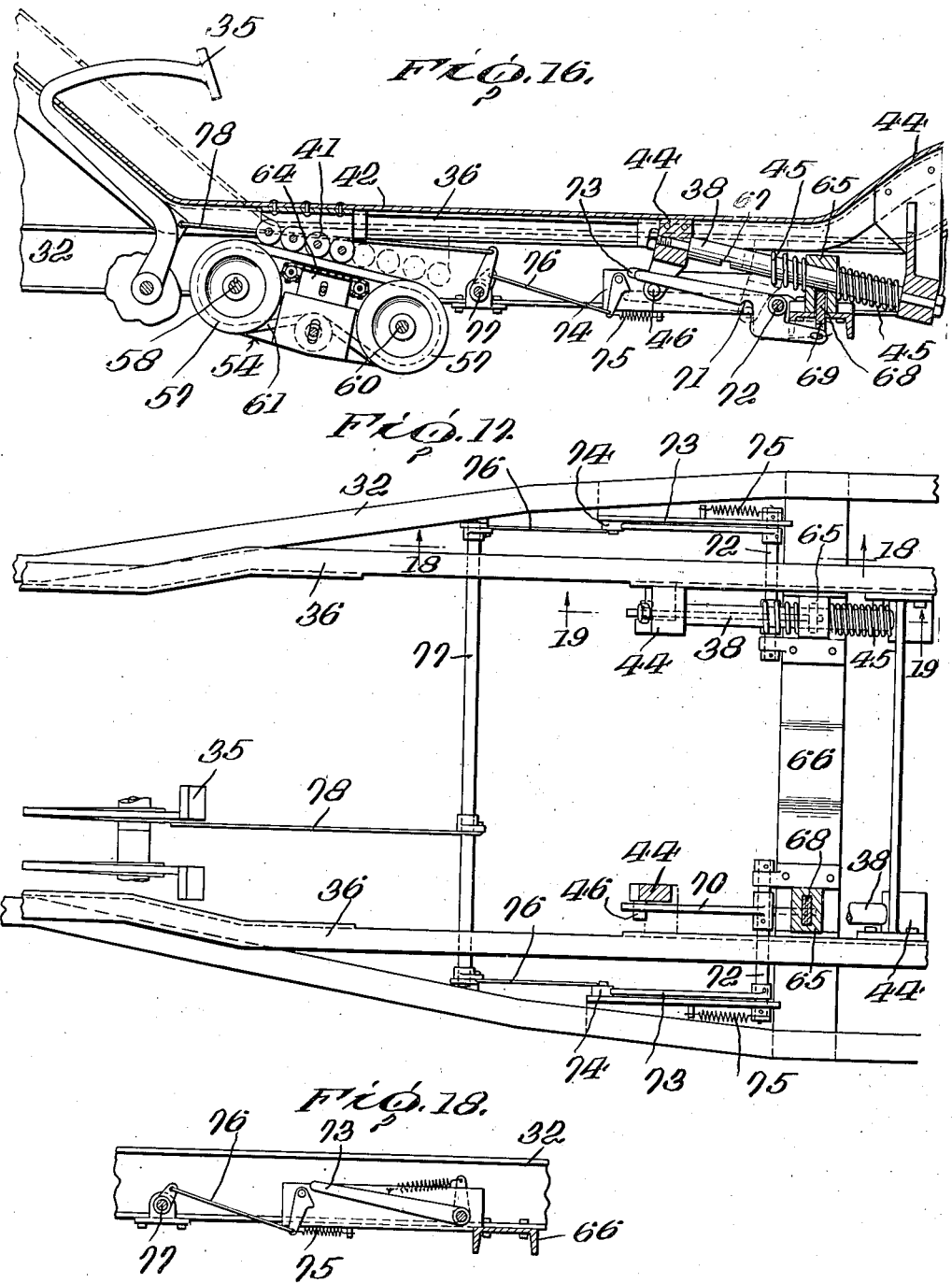

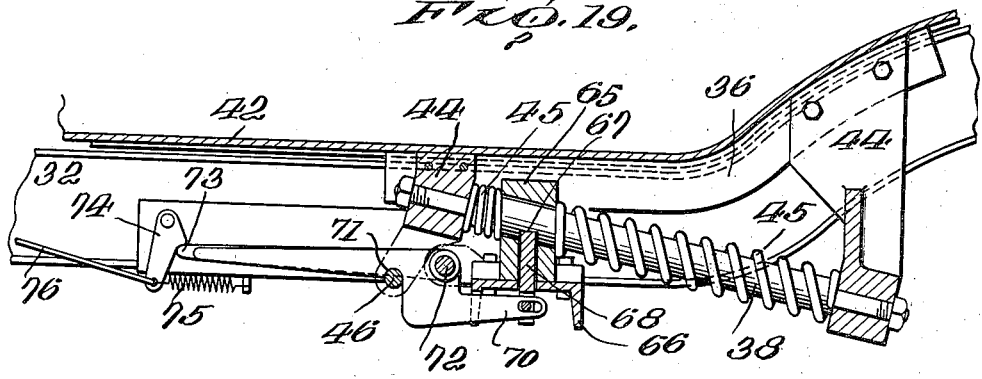

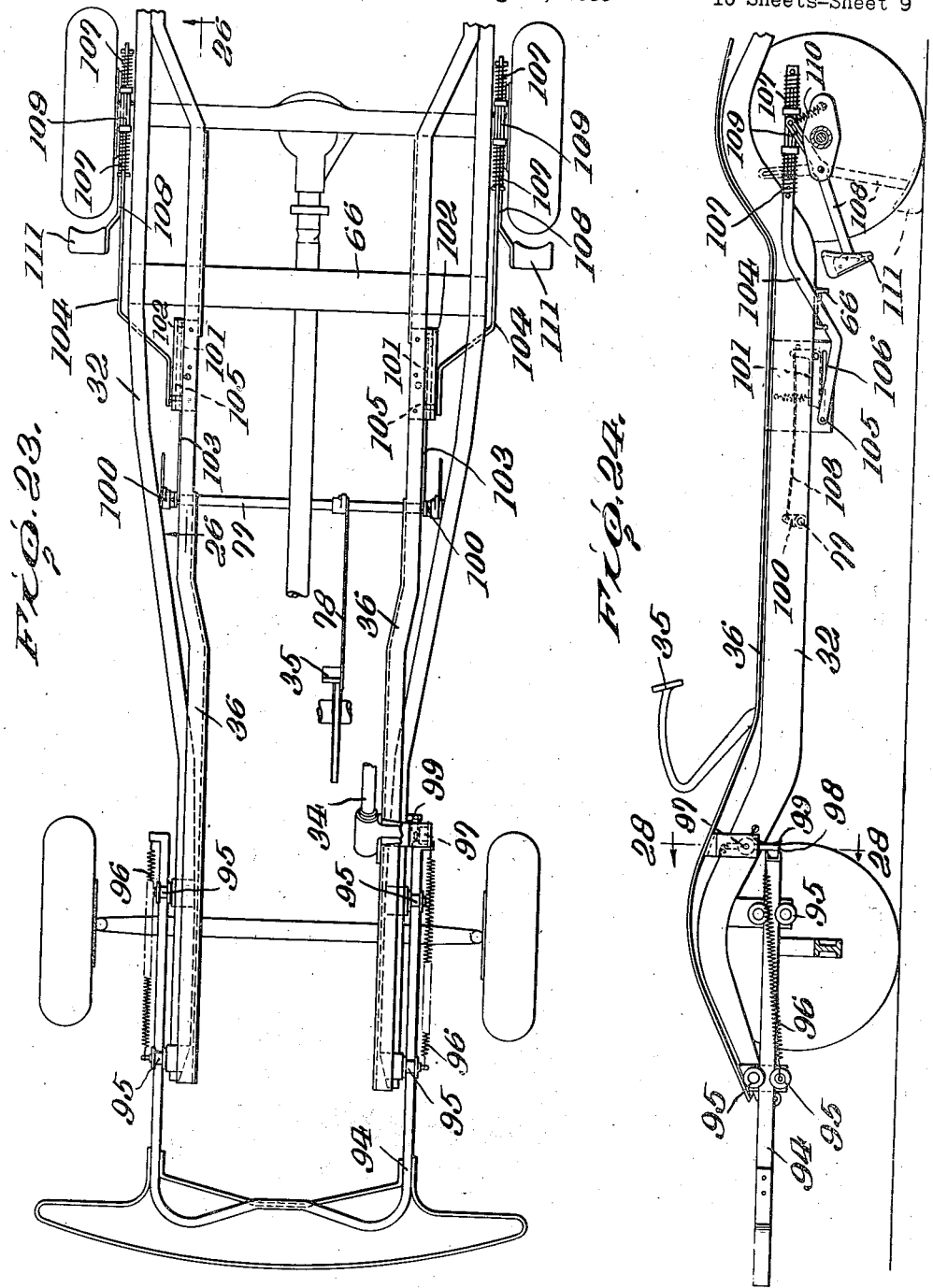

Sept. 23, 1941.   D. A. APOSTOLOU   2,256,857
DEVICE FOR NEUTRALIZING THE INERTIA OF VEHICLE BODIES
Filed Aug. 3, 1939   10 Sheets-Sheet 10
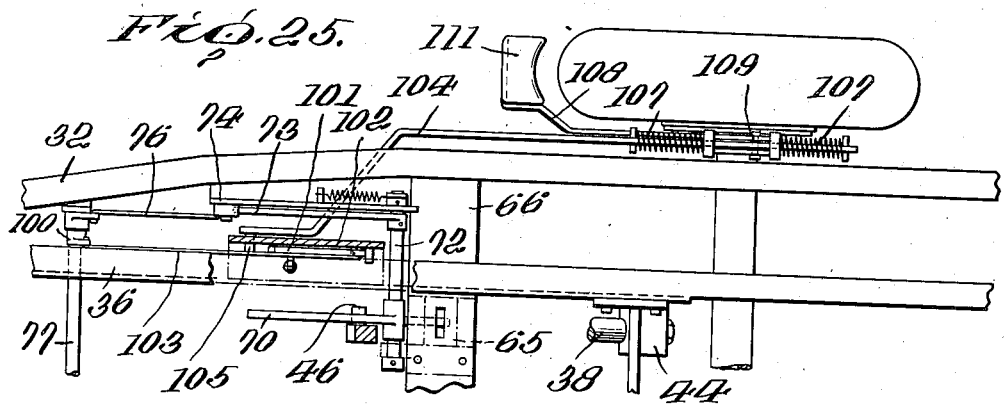
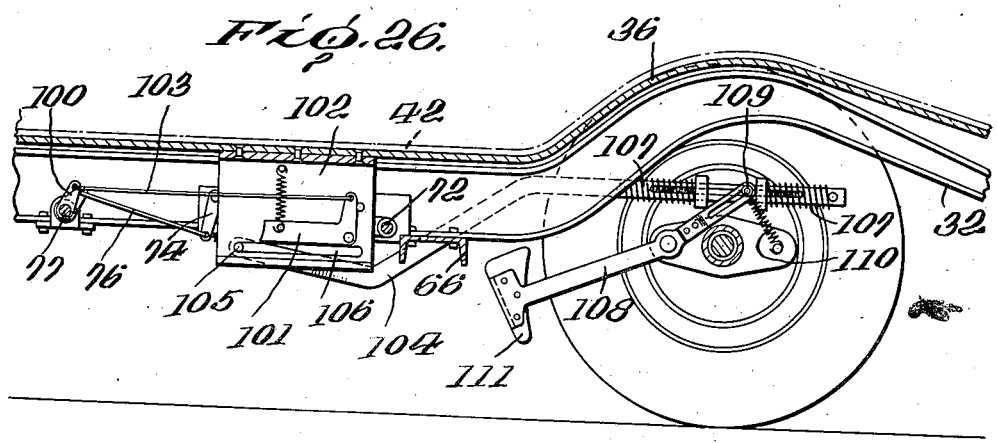
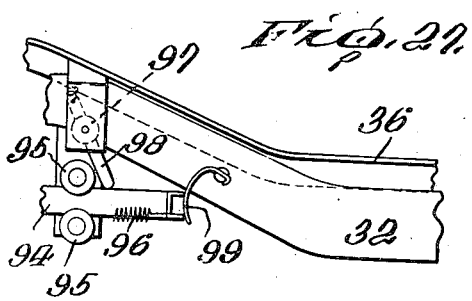
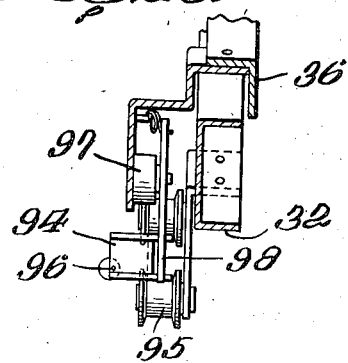
INVENTOR.
D. A. Apostolou
BY E. F. Wenderoth
ATTORNEY.

Patented Sept. 23, 1941

2,256,857

UNITED STATES PATENT OFFICE 2,256,857

DEVICE FOR NEUTRALIZING THE INERTIA OF VEHICLE BODIES

Demeter A. Apostolou, Athens, Greece

Application August 3, 1939, Serial No. 288,214
In Greece October 14, 1937

7 Claims. (Cl. 180—1)

The chief object of this invention is to provide a device for neutralizing acquired speed or momentum in order to avoid harmful or undesired consequences of such speed or momentum, for example, such as arise in the event of sudden reduction of speed or sudden stopping of moving masses such as motor vehicles, engines, cars, airplanes, etc.

This neutralization applies not only to the vehicular or other mass as a unit, but also to any mass being carried upon such unit or within it, as for example loose goods, baggage, and passengers, as well as being applicable to trailers and other connected trains of vehicles.

By this invention, the harmful consequences which naturally follow an abrupt reduction in speed are automatically eliminated regardless of the suddenness of slowing down or stopping. A motor car, for instance, running at its maximum speed (100–150 km. per hour or faster) can be stopped as abruptly as its brakes will permit, without any disturbing or harmful shock to passengers or injury and destruction to itself or goods being carried upon it, in the manner hereafter explained.

The theory upon which the present invention proceeds is the following:

Assume a certain mass to be moving upon a moving surface (belt)—the mass traveling in one direction while the surface on which it is running is traveling in the opposite direction. Now, when the relative speeds of the moving mass and the moving surface are so synchronized that they are equal, but in opposite directions, the moving mass will appear to a stationary observer to be at a standstill. In the same manner, the freight or passengers being carried upon a mass moving as described,—notwithstanding the fact that said freight or passengers have a speed corresponding to the acquired speed of the moving mass,—will not exhibit as regards the stationary surroundings any of the consequences of inertia, in view of the apparent immobility of the mass, so long as its forward momentum becomes neutralized by the surface upon which it is running, said surface moving in the opposite direction with an equal power and speed.

Now, to place beneath the wheels of a moving mass or a mass moving on rails, a surface moving in the opposite direction, at a time when it would be desired to offset the effects of acquired speed and inertia, is not only impractical but, even if practically possible, would bring results directly contrary to those aimed at; for it would be most undesirable to bring abruptly into frictional contact two powerful forces moving at fast speeds in opposite directions. Before the desired synchronization could be effected, there would occur a violent shock with injurious consequences.

However, by the present invention as hereinafter explained, it becomes possible to neutralize, completely and without danger, the consequences of acquired speed and inertia, basing the invention on the theory above described; because the oppositely moving surface is already installed between the mass whose momentum is to be affected, and the chassis upon which said mass is mounted, as will be explained in connection with the drawings.

In short, then, the general object of this invention is the elimination of accidents in connection with any type of vehicle, inasmuch as it makes possible the most complete and abrupt braking without danger of destruction or injury to the moving mass or the freight being carried, and without danger of death or injury to passengers. It also becomes possible to prevent striking any obstacles or pedestrians.

With the foregoing objects in view, the invention comprises a moving surface or belt moving in a direction opposite to that in which the vehicle is proceeding. Said surface is placed between the chassis of the vehicle and its body,—the body being the mass whose acquired speed and inertia is to be neutralized.

Beneath the body of the vehicle I attach sets of small wheels and when the body of the vehicle, after sharp braking, tends to roll forward even slightly on small rollers which are placed between the chassis and the body, these sets of small wheels come upon the above-mentioned moving surface which is moving in the opposite direction. When these small wheels come into contact with the oppositely moving surface and roll upon it, the body or mass ceases its tendency to surge forward, because this forward motion is smoothly absorbed or neutralized by the action of the oppositely moving surface.

To give a particular example, consider the application of the invention to an automobile:—with the sudden braking of the car, only the chassis and engine, including the radiator and transmission system, are abruptly halted; the body and its appurtenances, including fenders, engine and radiator covers, are allowed to surge forward slightly, (by means of the above-mentioned rollers) so that this weight, including any passengers or freight that may be thereon or therein, is taken up upon the oppositely moving surface through the small sets of wheels. As the rapidly moving surface receives the weight of the body, its opposite action neutralizes or absorbs the forward running of the body,—that is, although the body is still presumably rolling forward, the oppositely running surface prevents the body of the car from gaining any ground, for this oppositely moving surface has the tendency to push and carry the weight back so that, when there is the necessary synchronization, depending on the rapidity of the moving surface in relation to the traveling speed of the vehicle, there immediately occurs complete neutralization of the acquired speed and momentum, without any danger to the vehicle, or its passengers or freight. The synchronization referred to above may be aided and made faster and better by light spring action between the chassis and body as hereinafter explained.

It may be noted that, in view of the rollers referred to above, it will not be necessary for the oppositely moving surface to bear the entire weight of the body, for a good proportion of the weight towards the rear of the body will be carried upon these rollers, and only the forward weight of the body will come to bear on the oppositely moving surface.

The power necessary to activate the oppositely moving surface may be derived from the engine of the vehicle. Thus, immediately upon the application of the brakes, all the engine's power is available for the working of the moving surface. However, various other activating forces such as compressed air or any other type of force independent of the force which drives the vehicle may be used for driving the moving surface. If the power is taken from the driving engine of the vehicle, the necessary amount is negligible and in no way detracts from the needed power for forward drive.

It is also a feature of the invention that means will be provided whereby on the one hand, the chassis and body may be automatically joined and held rigidly together during normal driving, and, on the other hand, whereby there may be effected the automatic release of the body (which will tend to surge forward and be carried upon the moving surface), from the chassis (which will remain absolutely stationary) on sharp emergency braking.

It may be added that also in accordance with the present invention there may be achieved the speedy and opportune stopping of a vehicle or train of connected cars independently of a driver's particular ability or capacity, in a certain situation, to apply the brakes. According to this aspect of the invention, the automatic stopping of a vehicle or train of connected cars is accomplished by a special fender or bumper which can be placed at the front end of the vehicle, or of each car in a train, which bumper can act instantaneously on the brakes, directly such bumper receives a sufficient specified pressure to force it backwards. The sudden stop achieved in this manner will not have harmful consequences due to the provision of the neutralizing device of the invention.

Finally, with reference to the particular aspect of the invention set forth in the previous paragraph, and also with reference to the invention generally, there may be provision for effecting braking of a vehicle or train of vehicles without the usual slipping of the wheels; this is accomplished by the provision of chucks or any other type of wedge, which can be automatically inserted and withdrawn, at the proper time and in the proper manner, between the front end of the wheels and the road surface or trail rails.

With the above and other objects in view which will appear from the detailed description below the invention is shown as applied particularly to an automobile. It is obvious that the invention is capable of many embodiments and the drawings show only a preferred method of construction.

Referring to the drawings:

Fig. 1 is a side elevation of an automobile in normal running position, said automobile being provided with the neutralizing device of my invention.

Fig. 2 is a side elevation of the automobile of Fig. 1 after the brakes have been applied, the body being shown shifted forward relative to the chassis.

Fig. 3 is a front elevation of the automobile illustrating the power take-off from the motor.

Fig. 4 is a vertical transverse section through the take-off from motor crank shaft, the section being taken substantially on line 4—4 of Fig. 3.

Fig. 5 is a vertical longitudinal section taken substantially on line 5—5 of Fig. 3, showing the body in its forward position after the brake has been applied, and illustrating the relation of the body to the chassis in this position.

Fig. 6 is a side view of the automobile chassis showing the adjustable steering mechanism in its normal position.

Fig. 7 is a top view of the chassis showing the device of the invention attached thereto and also showing the power take-off.

Fig. 8 is a side elevation of the chassis showing the drive for the neutralizer.

Fig. 9 is a side elevation of a frame, that is attached to the bottom of the body, showing the parts of the mechanism carried thereby.

Fig. 10 is a bottom plan view of the parts shown in Fig. 9.

Fig. 14 is a vertical longitudinal section through the neutralizer.

Fig. 15 is a vertical section in front of the belt wheels taken substantially on line 15—15 of Fig. 13.

Fig. 16 is a section through the body showing same in forward position and showing the neutralizer in elevation.

Fig. 17 is a plan of the chassis and body frame in unlocked position, parts being omitted for clearness.

Fig. 18 is a side elevation of the locking pawl and its lever.

Fig. 19 is a vertical longitudinal section through the sliding bar and showing same in locked position.

Fig. 20 is a vertical section taken on line 20—20 of Fig. 5.

Fig. 21 is a diagrammatic view showing the arrangement for operating the carburetor.

Fig. 22 is a sectional view taken on line 22—22 of Fig. 6.

Fig. 23 is a top plan of the chassis showing the bumper-operated master brake cylinder, and also showing the chucks and associated parts.

Fig. 24 is a side elevation of parts shown in Fig. 23.

Fig. 25 is an enlarged fragmentary portion of parts shown in Fig. 23.

Fig. 26 is a sectional view taken on line 26—26 of Fig. 23.

Fig. 27 is a side elevation of the master valve for the brakes in operating position.

Fig. 28 is a vertical section taken on line 28—28 of Fig. 24.

Figure 11:
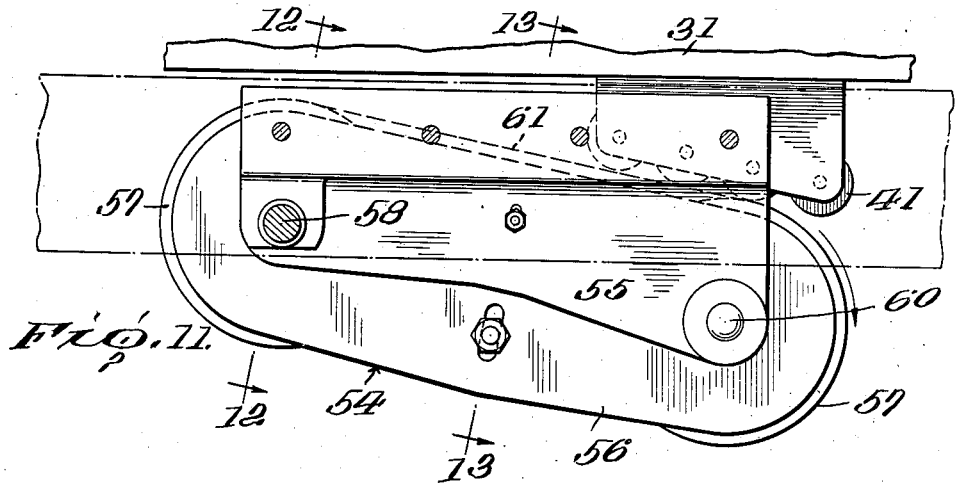
Fig. 11 is a side elevation of the neutralizer and its support.
Figures 12, 13:
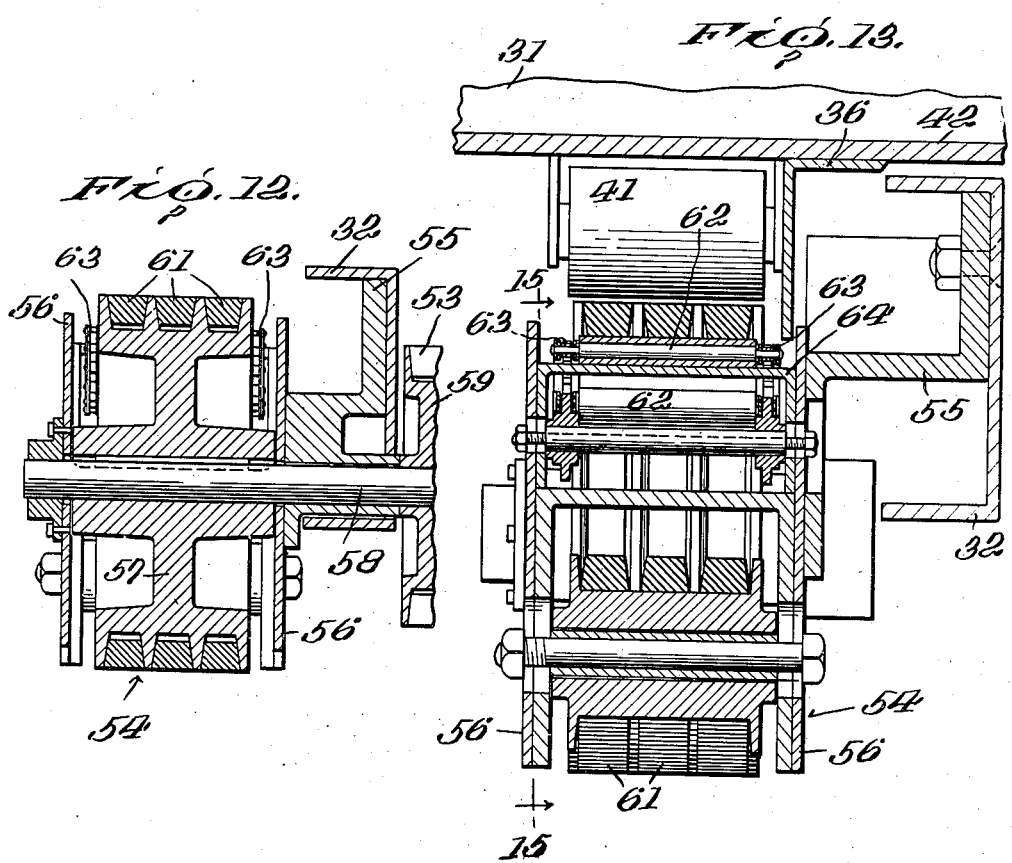
Fig. 12 is a vertical transverse section taken substantially on line 12—12 of Fig. 11 and illustrating the drive shaft for the neutralizer.
Fig. 13 is a vertical transverse section taken substantially on line 13—13 of Fig. 11.

Referring to the drawings, 31 designates the body of the automobile, said body being movable with respect to the chassis 32. 33 designates the motor, 34 the steering column and 35 the brake pedal (foot). Longitudinal strips 36 are fastened to the floor of the body to support and carry fenders, hood and a grill in front of radiator. Guiding bars 38 prevent the body from moving sidewise. Front rollers 39 are provided for guiding the front part of body and rear rollers 40 are provided for guiding the rear of body when the body moves from front to rear of chassis 32. 41 designates sets of wheels mounted on the underside of body 31. 42 is the floor of the body and 43 is the hood over the motor. Brackets 44 attached to strips 36 and floor 42 of the body carry the aforesaid guide bars 38. Springs 45 are provided on guide bars 38 to take up shock upon braking and help force the body back to normal position. 46 designates locking pins on front brackets 44.

The body includes the steering column, hood, grill, fenders, longitudinal strips 36, which have attached thereto the front rollers 39, rear rollers 40, the sets of wheels 41, brackets 44 which carry the guide bars 38 and springs 45, and other parts which will be mentioned later. All of these parts move as a unit with the body of the car.

Mounted on or to the side frames of the chassis are motor 33 and radiator 47.

The drive for the moving surface of the neutralizer of the invention is provided by the extension 48 of the crank shaft as shown in Figure 4. This extension has drive gear 49 thereon meshing with a driven gear 50 mounted on and pinned to shaft 51 extending across the front of the motor. This shaft carries at its outer ends belt pulleys 52 on which are mounted belts 53 for driving the neutralizers 54. These neutralizers are mounted on each side of the chassis frame on brackets 55.

The neutralizers 54 include side plates 56 and a triple belt pulley 57 fixed to shaft 58 which carries a driven pulley 59.

The rear triple pulley 57 rides on stub shaft 60. Belts 61 extend around pulleys 57 and long rollers 62. A plate 64, U-shaped in cross section, supports the long rollers 62 beneath the load and a link chain 63 connects the rollers 62.

These belts and pulleys, chains and rollers are in motion whenever the motor 33 is running.

The body and its parts are held in normal riding position, as shown in Figs. 1, 6, 11, 14, 15 and 19, by the bar 38 resting in the guide bushings 65 mounted on a channel bar 66 extending between the side frames of the chassis. The guide bars 38 have a notch 67 (Fig. 16) in the underside thereof adjacent the front end. 68 is a bolt for locking bar 38 in position as shown best in Fig. 19 thus holding the body of the car in the normal riding position of Fig. 1. A lever 70 is provided for operating bolt 68, this lever being connected to the bolt by a pin and slot connection 69. A recess 71 in lever 70 receives pin 46 on bracket 44 and this locks bar 38 in its rearward position. 72 are stub shafts on each side of the chassis having locking levers 73 on the outer ends thereof (Fig. 17). The pawls 74 have springs 75 and operating cables 76 connected to rocker shaft 77 which in turn is operated from the brake foot pedal 35 by cable 78.

When brake pedal 35 is pressed to apply the brakes of the car, cable 78 is pulled forward, rocking shaft 77 in a counterclockwise direction, viewed in Fig. 16, pulling on cables 76 to swing pawls 74 unlocking or releasing levers 73 permitting shafts 72 to rotate, freeing pins 46 from levers 70, and pulling bolts 68 from notches 67 allowing the momentum of the car to move the body forward. When the wheels 41 come in contact with the belts 61 of the neutralizer, which belts are always traveling in a clockwise direction, the force will tend to return the body to normal position. In view of the relative movement between the body and chassis, all panel instruments and accelerator connections must naturally be of a flexible nature.

The rollers 39 and 40 ride on front trackways 80 and rear trackways 81 (Fig. 7) mounted on the side frames of chassis 32.

To increase the speed and force of the neutralizers 54 the motor is preferably driven at full speed when the body moves forward. For this purpose a carburetor actuating spring 83 is connected between the carburetor 82 and the moving frame 36 (Fig. 21).

The steering column 34 of course moves with the car body. Therefore, a flexible connection such as shown in Figs. 5, 6, 7, 8 and 22 is preferably provided. This connection comprises bevel gears 84, 85 (Fig. 22) between the steering gear worm wheel shaft 86 and a transfer shaft 87 which is square in cross section. 88 is a bearing, associated with an inverted U-shaped bracket 89 pivoted on pin 90. The steering arm 92 is keyed to pinion 91 which meshes with a pinion 93 on the transfer shaft. Pivot pin 90 is anchored to the side frame of chassis 32 as shown in Fig. 22.

The steering motion, no matter what position the body is in with respect to chassis, is transferred from the steering gear worm wheel shaft 86 to the steering arm 92 through gears 84 and 85, transfer shaft 87, gear 93 and gear 91 to the arm 92 to move the drag link of the car in the usual manner.

Referring now to the means for securing automatic braking when desired, 94 (Figs. 23—24) designates a horizontal U-shaped bumper frame. 95 are rollers carried by chassis on which frame 94 is slidably mounted and 96 are springs placing normal forward tension on frame 94. A master brake cylinder 97 has actuating arms 98 normally held against one end of frame 94 by leaf spring 99. Backward movement of bumper frame 94 moves arm 98 to actuate master brake cylinder 97.

There will now be described means for securing positive braking action without sliding of the wheels when desired. Lever arms 100 are mounted on the previously described shaft 77 (Figs. 23—24) and cables 103 connect said lever arms 100 with bell crank levers 101 mounted on depending brackets 102 of the body. Link members 104 have pins 105 extending into slots 106 formed in brackets 102. Springs 107 urge the link members to normal position. Levers 108 are pivoted to brackets on the rear axle assembly and a pin and slot connection 109 is provided between lever 108 and link member 104. Spring 110 normally urges the lower end of levers 108 upwardly, said lower end having a wedge-shaped shoe or chuck 111 thereon.

Normal actuation of brake foot pedal 35 merely takes up slack in cable 103. However, sudden quick actuation of foot pedal 35 causes bell cranks 101 to move into the path of pins 105, and forward shifting movement of body 36 causes the bell cranks to engage pins 105 to move members 104 forwardly and in turn to swing levers 108 to cause shoes 111 to engage the treads of the rear wheels and ground acting as a check.

While the invention has been described with reference to an automobile it is obvious that the invention is capable of general application.

I claim:

1. In a propellable vehicle, the combination of propelling means, a body susceptible to the action of said propelling means and formed of component parts, and means also driven by said propelling means interposed between said component parts adapted to neutralize or absorb the forces arising from a braking of the body in movement or from holding said body to immobility against the action of the propelling means.

2. A device for neutralizing the speed and momentum of a moving body in relation to a body adapted to be braked associated therewith, said device comprising a surface on the body to be braked, means for moving said surface in a direction opposite to the direction of movement of the moving body, and anti-friction means on the moving body through which the moving body is adapted to contact with the moving surface on the body to be braked.

3. A vehicle according to claim 1, having driving means for the neutralizing means, said driving means being independent of the propelling power of the vehicle.

4. A device according to claim 2 having a spring between the moving body and the body to be braked.

5. A device according to claim 2 in which the anti-friction device comprises a plurality of wheels.

6. A device according to claim 2 having means for normally locking the moving body and body to be braked, and means for automatically releasing said lock when braking occurs.

7. A device according to claim 2 in which means are provided between the moving body and the body to be braked to take up shock upon braking and assist in moving said moving body back to normal position.

DEMETER A. APOSTOLOU.